United States Patent Office 3,343,926
Patented Sept. 26, 1967

3,343,926
OXIDATION-REDUCTION PROCEDURE FOR PARTICLE-SIZE REDUCTION OF UO₂
Irving E. Knudsen, Downers Grove, and Norman M. Levitz, Bellwood, Ill., assignors to the United States of America as represented by the United States Atomic Energy Commission
No Drawing. Filed Feb. 8, 1966, Ser. No. 526,334
6 Claims. (Cl. 23—355)

ABSTRACT OF THE DISCLOSURE

A method of reducing the particle size of uranium dioxide by oxidizing the dioxide with less than half of the oxidizing agent necessary to completely oxidize the dioxide and thereafter reducing to the dioxide.

---

The invention described herein was made in the course of, or under, a contract with the United States Atomic Energy Commission.

The invention relates to particle-size reduction by an oxidation-reduction procedure. More specifically, the invention concerns a method for producing high-density uranium dioxide or mixtures of uranium dioxide and minor amounts of plutonium dioxide by passing steam, hydrogen and actinide hexafluoride through a fluidized bed, the average particle size in which is controlled by an oxidation-reduction cycle.

Because of its many desirable characteristics uranium dioxide is widely used as a nuclear fuel and may be fabricated by the simultaneous reduction and hydrolysis of uranium hexafluoride. The reaction between steam, hydrogen and uranium hexafluoride, in accordance with the following equation:

$$UF_6(g) + 2H_2O(g) + H_2(g) \rightarrow UO_2(s) + 6HF(g)$$

may be used to produce dense phase uranium dioxide particles. A fluidized bed process as described in U.S. Patent No. 3,160,471 is applicable; however, as the reaction continues, uranium dioxide is produced, and the bed particles of uranium dioxide increase in both size and weight. Since the bed particles must be maintained within certain size and weight limits for successful operation of the process, the actinide dioxide production must be interrupted periodically in order to adjust the particle size of the fluidized bed. The size adjustment may be accomplished by stopping the dioxide production cycle and removing the bed particles in order to separate the excessively large diameter particles by sieving. After the removed particles are replaced with smaller diameter particles, the bed is returned to its original average particle size. The size adjustment may also be made by removing only a portion of the bed particles during the dioxide production cycle to auxiliary equipment and thereafter separating and replacing as above. These frequent interruptions are detrimental to the process efficiency; therefore, any reduction in the frequency of stoppages or reduction in lost production time would be advantageous.

The particle breakup generated by the method of the present invention, which may occur directly in the fluidized bed or may occur outside of the fluidized bed, continues during subsequent uranium dioxide production, thereby reducing the frequency of interruptions. When the size-reduction cycle is applied directly to a fluidized bed, no additional equipment is required. Making use of one set of equipment for dual purposes is economically advantageous as compared to those processes which require separate facilities for the size-reduction step.

The invention broadly entails reacting particles which exceed a predetermined size with an oxidizing agent in sufficient quantity to partially oxidize at least a portion of the particles, then reducing the particles to their original chemical composition. In the application of this invention to the production of uranium dioxide by the fluidized bed method illustrated in U.S. Patent No. 3,160,471, the production of the UO₂ particles is interrupted and an oxidizing agent is passed through the bed of enlarged UO₂ particles in a quantity which partially oxidizes at least a portion of the UO₂ to U₃O₈, then a reducing agent is passed through the bed, forming UO₂ particles which are smaller in average diameter than those at the start of the oxidation-reduction cycle. When the particle-size reduction is completed, the production of uranium dioxide is continued. In addition to in situ particle-size reduction, a portion of the bed particles may be removed during the dioxide-production cycle and placed in auxiliary equipment for particle-size reduction.

Surprisingly, it has been discovered that for some unknown reason partial oxidation, with a particular amount of oxidizing agent, followed by reduction produces particle breakup which initially reduces the uranium dioxide particle growth rate in the following uranium dioxide production step, and yet, does not produce particle fines in an amount which would make the process undesirable. A series of examples may set out the invention more clearly.

Example I

The following runs were carried out in a 3-inch diameter Monel reactor, the superficial gas velocity was 1.0 ft./sec. during oxidation the starting bed particles were in the range −18 +180 mesh reduction was carried out in 100% hydrogen at 650° C. for 30 minutes (except for Run 2 which was 45 minutes) the starting bed weight was 1.5 kg. (except for Run 1 which was 1.0 kg.) and the starting particle density [1] was 8.9 cc.

TABLE I

| Run No. | 1 | 2 | 3 | 4 | 5 |
|---|---|---|---|---|---|
| Oxidation Conditions: | | | | | |
| Temperature (° C.) | 650 | 400 | 400 | 400 | 650 |
| Air Concentration (percent in nitrogen) | 10 | 10 | 20 | 10 | 20 |
| Equivalents Oxygen Fed [a] | 0.70 | 0.80 | 1.20 | 1.20 | 1.18 |
| O/U after Oxidation | 2.38 | 2.46 | 2.53 | 2.55 | 2.61 |
| Amount in −80 mesh fraction (percent): | | | | | |
| After Oxidation | 17.1 | 14.7 | 64.5 | 64.9 | 83.4 |
| After Purging | 23.7 | 20.9 | 74.6 | 66.3 | 84.8 |
| After Reduction | 26.8 | 52.0 | 77.1 | 70.8 | |
| Final Bed | 42.2 | 61.3 | 76.7 | 70.8 | 86.6 |
| Ratio of −325 mesh/−80 mesh in Final Bed | 0.45 | 0.20 | 0.31 | 0.34 | 0.44 |
| Particle Density,[b] −80 +170 Mesh Fraction (g./cc.) | 8.3 | 8.0 | 7.1 | 6.6 | 7.9 |

[a] Expressed as the ratio of oxygen fed to the reactor to the stoichiometric equivalent of oxygen required for oxidation of UO₂ to U₃O₈.
[b] Measured by mercury displacement after the reduction step.

The bed material, UO₂, was heated to the reaction temperature while being fluidized with nitrogen, then oxidized for the required time with the air-nitrogen mixture; the system was then purged with nitrogen for a minimum of 20 minutes or until the bed was heated to 650° C.

The extent of particle breakup is shown by the amount of −80 mesh particles formed. Runs 1 and 2 show that adequate particle breakup was obtained with partial oxidation to U₃O₈ (0.7 and 0.8 stoichiometric equivalents of oxygen fed) but that excessive amounts of −325 mesh particles were formed when the oxidation was carried this near to completion. Particle breakup continued during all phases of the test after oxidation, e.g., in Run 1 the amount in the −80 mesh fraction was only 17% after

---

[1] Measured by mercury displacement after the reduction step.

oxidation, 24% after purging, 28% after reduction and 43% after cooling down. However, it should be noted that the difference in the amount of breakup after oxidation to the final bed was greatest in Runs 1 and 2, where less than the stoichiometric quantity of oxygen was used. Over-all particle breakup was proportional to the degree of oxidation; typically, 43% breakup occurred in Run 1 for which the final O/U was 2.38, and up to 87% breakup for Run 5 for which the final O/U was 2.61. The percent −325 mesh in the −80 mesh fraction was relatively high in all cases, ranging from 20% to 45%.

Oxidation temperatures affected size distribution. Higher reaction temperatures resulted in faster surface reactions which produced greater amounts of fines as shown in sieve analyses of the final beds, where the proportion of −325 mesh material in the −80 mesh fraction was smaller when the oxidation was carried out at 400° C. rather than at 650° C. (0.2 to 0.34 at 400° C. as compared to 0.44 and 0.45 at 650° C.). The higher air concentration (based on Runs 3 and 4) gave greater particle breakup, a slightly better (lower) −325 mesh/−80 mesh ratio, and denser particles. Finally, the particle density of the −80 +170 fraction after reduction was higher, on the average, when the higher oxidation temperature was used, the density values being 8.1 as compared with 7.2 g./cc.

*Example II*

The following tests were made to ascertain the usefulness of the oxidation-reduction procedure in an actual $UO_2$ production cycle. In situ particle-size reduction of an entire bed in a 3-inch diameter Monel reactor was carried through four cycles of particle-size reduction and three of particle growth. It was desired to control the bed-particle size in the range of from 200–400 microns. Oxidation was conducted at 400° C. with 20% air diluted with nitrogen. The quantity of air used ranged from 0.52 to 0.25 times the stoichiometeric amount required for conversion of $UO_2$ to $U_3O_8$. The oxidized particles were reduced for one hour at 650° C. with hydrogen diluted slightly with a small amount of purge nitrogen.

The hexafluoride-conversion portions were run at a temperature of 650° C., the superficial gas velocity was 1.0 ft./sec., and the $UF_6$ feed rate was 50 g./min. for 30 min./hr. The steam/$UF_6$ mole ratio was 2.6/1, the $H_2$/$UF_6$ mole ratio was 6.7/1, and the steam/$H_2$ mole ratio during cleanup was 1/1. The bed weight and height was kept between 6 to 12 kg. and 9 to 18 inches (static), while the run time ranged from 10 to 17 hours.

TABLE II.—SUMMARY OF $UF_6$ CONVERSION AND OXIDATION-REDUCTION CYCLES

| Cycle Process Step | Duration (hr.) | Average Particle Diameter (μ) in Bed | |
|---|---|---|---|
| | | Initial | Final |
| First Oxidation-Reduction | 3 | 360 | 154 |
| $UF_6$ Conversion | 16 | a 185 | 386 |
| Second Oxidation-Reduction | 3 | 386 | b (180) |
| $UF_6$ Conversion | 17 | b (180) | 379 |
| Third Oxidation-Reduction | 3 | 379 | 171 |
| $UF_6$ Conversion | 10 | a 202 | 402 | a After particle-size adjustment by removing a portion of the −120 mesh particles.
b Estimated value.

For the run where the oxidation consisted of 0.37 equivalents of oxygen, sieve analyses showed 30% −80 mesh fraction. A comparison of these results with Run 1 of Table I where 0.70 equivalents of oxygen produced breakup of 42.4% −80 mesh fraction shows that a little more than half as much oxygen produced about 70% of the breakup. This unexpected difference may be accounted for by the deeper bed used in the second set of tests, which would increase the utilization of the oxygen passing therethrough and by the additional and unexplainable particle breakup during the purge periods.

Of major importance was the extent of undesirable fines produced. The ratio of −325 mesh/−80 mesh fraction was initially low in the tests using 0.37 equivalents of oxygen, in the range from 0.04 to 0.07 as compared to 0.20 to 0.45 in Table I. However, as the runs progressed, excessive fines were produced, and in an effort to reduce this undesirable effect, a fourth run was performed with a still lower oxygen equivalent feed.

The fourth oxidation-reduction treatment used 0.25 equivalents of oxygen but in other respects the operating conditions were the same as described in Example II. Not only was the fine production carefully monitored but also the particle breakup in each and every phase of the reaction process.

Particle breakup, expressed as cumulative values from the −80 mesh fraction, was as follows:

| | Percent |
|---|---|
| After oxidation | 2.2 |
| After reduction | 4.1 |
| After 8 hrs. of fluidization | 11.8 |
| After 16 hrs. of fluidization | 16.0 |
| After 24 hrs. of fluidization including heating to 650° C. and treating with steam and hydrogen for 1 hr. | 20.6 |

The above figures show that particle breakup, which included coarser fractions such as +45 mesh as well as fractions below the 80 mesh sieve size, continued not only during the nitrogen purge following the reduction but also during the subsequent fluidization. Of major significance was that the ratio of −325 mesh/−80 mesh was low after the reduction step, 0.06, and remained within acceptable limits after the entire 24 hours of fluidization, by not increasing to over a maximum value of 0.18.

Although this procedure for reducing the size of particles does not apply to plutonium dioxide, it does apply to mixtures of uranium dioxide and minor amounts of plutonium dioxide. It is expected that the procedure will apply to fast reactor fuels wherein up to 20 weight percent plutonium dioxide may be present. The particle breakup is caused by oxidation and reduction of the uranium content of the mixture. The particle breaks down as though it were pure uranium dioxide because of the relatively high proportion of uranium dioxide distributed uniformly through the particles. Such mixtures arise when nuclear fuel incorporating both uranium and plutonium are processed by the fluoride volatility process.

The above examples are meant to be illustrative of the invention, not to define its limits; such is the purpose of the appended claims.

What is claimed is:

1. A method for reducing the particle size of uranium dioxide and mixtures of uranium dioxide containing a minor amount of plutonium dioxide comprising oxidizing said dioxide and dioxide mixtures with less than half of the stoichiometric amount of oxidizing agent necessary to oxidize the uranium dioxide to $U_3O_8$ and thereafter reducing to the dioxide.

2. The method of claim 1 wherein the oxidation is accomplished with about 20–30% of the stoichiometric amount of oxidizing agent necessary to oxidize the $UO_2$ to $U_3O_8$.

3. The method of claim 1 wherein the $UO_2$ particles are present in a fluidized bed and are oxidized with 25% of the stoichiometric amount of 20% air diluted in $N_2$ necessary to oxidize the $UO_2$ to $U_3O_8$ at about 400° C. and thereafter reducing in hydrogen at about 650° C. for about one hour.

4. In a method for converting uranium hexafluoride and mixtures thereof with minor amounts of plutonium hexafluoride to high density actinide dioxide comprising:
 (a) establishing and maintaining a fluidized bed of particles of said actinide oxide by passing a mixture of hydrogen and steam upwardly therethrough,
 (b) heating the bed, (c) feeding actinide hexafluoride to the bed intermittently whereby actinide hexafluoride, steam and hydrogen react to form said actinide dioxide, some of which deposits on the actinide dioxide particles causing them to grow in size, (d) the improvement consisting of interrupting the reaction when the average particle size increases above a predetermined value, (e) partially oxidizing at least a portion of the uranium dioxide in said actinide dioxide by passing through the bed less than about 50% of the stoichiometric amount of an oxygen-containing gas necessary to convert the uranium dioxide present in the bed to $U_3O_8$, (f) reducing the oxidized particles to the dioxide, and (g) resuming operation of the process.

5. The method of claim 4 wherein about 25% of the stoichiometric quantity of an oxygen-containing gas is employed.

6. The method of claim 4 wherein about 25% of the stoichiometric amount of air diluted in nitrogen at a temperature of about 400° C. is passed through said uranium dioxide to partially oxidize at least a portion thereof and hydrogen gas at a temperature of about 650° C. is thereafter passed through said partially oxidized uranium dioxide particles, thereby reducing said particles to the dioxide.

References Cited

UNITED STATES PATENTS

| 3,140,151 | 7/1964 | Foltz et al. | 23—355 |
| 3,160,471 | 12/1964 | Knudsen et al. | 23—355 |

OTHER REFERENCES

AEC Document, MAA–SR–3911, "Chemical Pulverization of Sintered $UO_2$ Bodies," pp. 16–17 (1960).

CARL D. QUARFORTH, *Primary Examiner.*

S. TRAUB, R. L. GRUDZIECKI, *Assistant Examiners.*